US008941273B2

(12) United States Patent
Kim et al.

(10) Patent No.: US 8,941,273 B2
(45) Date of Patent: Jan. 27, 2015

(54) VIBRATION GENERATION DEVICE

(71) Applicant: Samsung Electro-Mechanics Co., Ltd., Suwon, Gyunggi-do (KR)

(72) Inventors: Yong Tae Kim, Suwon-si (KR); Jung Taek Hong, Jr., Suwon-si (KR); Kyung Su Park, Suwon-si (KR); Dong Su Moon, Suwon-si (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 245 days.

(21) Appl. No.: 13/683,560

(22) Filed: Nov. 21, 2012

(65) Prior Publication Data

US 2014/0062225 A1   Mar. 6, 2014

(30) Foreign Application Priority Data

Sep. 6, 2012   (KR) .................. 10-2012-0098830

(51) Int. Cl.
  *H02K 33/00*   (2006.01)
  *H02K 33/18*   (2006.01)

(52) U.S. Cl.
  CPC ............. *H02K 33/00* (2013.01); *H02K 33/18* (2013.01)
  USPC .................................. 310/15; 310/25; 310/71

(58) Field of Classification Search
  USPC .............. 310/15, 17, 21, 25, 12.27, 12.33, 71
  See application file for complete search history.

(56) References Cited

U.S. PATENT DOCUMENTS

| 7,078,832 | B2* | 7/2006 | Inagaki et al. ............. 310/12.19 |
| 7,566,998 | B2* | 7/2009 | Winkler et al. ................. 310/51 |
| 7,679,233 | B2* | 3/2010 | Winkler et al. ................. 310/51 |
| 8,334,624 | B2* | 12/2012 | Dong et al. ..................... 310/25 |
| 8,400,027 | B2* | 3/2013 | Dong et al. ..................... 310/25 |
| 2003/0142845 | A1 | 7/2003 | Miyamoto et al. |
| 2011/0089772 | A1* | 4/2011 | Dong et al. ..................... 310/25 |
| 2013/0099602 | A1* | 4/2013 | Park et al. ....................... 310/25 |

FOREIGN PATENT DOCUMENTS

| JP | 2003-117489 A | 4/2003 |
| JP | 2003-220363 A | 8/2003 |
| JP | 201216153 A | 1/2012 |
| KR | 100926186 B1 | 11/2009 |
| KR | 20110088985 A | 8/2011 |

OTHER PUBLICATIONS

Korean Office Action issued in Application No. 10-2012-0098830 dated Aug. 22, 2013.

* cited by examiner

*Primary Examiner* — Thanh Lam
(74) *Attorney, Agent, or Firm* — McDermott Will & Emery LLP

(57) ABSTRACT

There is provided a vibration generation device, including: a housing including an internal space; a shaft passing through the internal space in an axial direction and mounted in the housing; a bearing member vibrated in the axial direction while contacting the shaft; a yoke mounted on the bearing member; a coil mounted on an outer surface of the yoke; a magnet interacting with electromagnetic force exerted on the yoke by the coil and included in the internal space; and at least one elastic member connected between an end of the yoke in the axial direction and a surface of the housing in the axial direction.

12 Claims, 8 Drawing Sheets

VIBRATION GENERATION DEVICE

CROSS-REFERENCE TO RELATED APPLICATIONS

This application claims the priority of Korean Patent Application No. 10-2012-0098830 filed on Sep. 6, 2012, in the Korean Intellectual Property Office, the disclosure of which is incorporated herein by reference.

BACKGROUND OF THE INVENTION

1. Field of the Invention

The present invention relates to a vibration generation device.

2. Description of the Related Art

A vibration generation device, a component converting electrical energy into mechanical vibrations using a principle of generation of electromagnetic force, is mounted in cellular phones, and the like, to be used for silently informing a user of call receipt.

Further, there is a growing demand for a multi-functional cellular phones as the market for portable electronic devices such as cellular phones, and the like, rapidly expands. Since demand for small, high-quality electronic device components is also increasing, demand for development of a vibration generation device having a new structure capable of remarkably improving quality while improving disadvantages of existing products has been increased.

As the release of cellular phones having large LCD screens rapidly increased in recent years, a vibration generation device for generating vibrations at the time of touch has been adopted due to the use of a touchscreen therein.

First, the vibration generation device used in a cellular phone in which a touchscreen is adopted is more frequently used than for generating vibrations at the time of call reception, and therefore, the operational lifespan of the vibrator needs to be increased. Second, the vibration generation device needs to have a rapid response speed, keeping pace with the speed of a user touching a touchscreen.

A cellular phone currently adopting a touchscreen uses a linear vibrator according to the demand for an extended lifespan and touch responsiveness.

The linear vibrator does not use a rotation principle of a motor but is vibrated by electromagnetic force having a resonance frequency determined by a size of an elastic member mounted in a vibrator and a weight body connected to the elastic member to generate vibrations.

As the size of the electronic device is reduced, the linear vibrator needs to be miniaturized. However, since the linear vibrator includes some essential components, limitations exist on the miniaturization of the linear vibrator. Therefore, a need exists for a linear vibrator having a new structure allowing for a dispositional relationship of components to be efficient.

Further, the linear vibrator generates vibration driving force by interaction between a magnet (a permanent magnet) and a coil (an electromagnet), but has degraded vibration performance due to interaction between the electromagnet and a magnetic material therearound during a repeated vibration process of the magnet included in the vibrator.

SUMMARY OF THE INVENTION

An aspect of the present invention provides a smaller linear vibrator by efficiently improving a disposition of components in the linear vibrator.

Another aspect of the present invention provides a linear vibrator capable of preventing a magnet from interacting with a magnetic material therearound during vibrations by configuring the magnet as a stator.

According to an aspect of the present invention, there is provided a vibration generation device, including: a housing including an internal space; a shaft passing through the internal space in an axial direction and mounted in the housing; a bearing member vibrated in the axial direction while contacting the shaft; a yoke mounted on the bearing member; a coil mounted on an outer surface of the yoke; a magnet interacting with electromagnetic force exerted on the yoke by the coil and included in the internal space; and at least one elastic member connected between an end of the yoke in the axial direction and a surface of the housing in the axial direction.

The coil may be wound around the outer surface of the yoke.

The magnet may be mounted on the surface of the housing in the axial direction.

The end of the yoke in the axial direction may have an inner diameter larger than an outer diameter of the magnet.

The bearing member may include first and second bearing members spaced apart from each other in the axial direction, and the first and second bearing members may include a weight body therebetween.

Outer surfaces of the bearing member and the weight body may be disposed in parallel in the axial direction, and the yoke may be mounted on the outer surfaces of the bearing member and the weight body so as to protrude to both ends of the first and second bearing members in the axial direction.

Both ends of the yoke in the axial direction may have an inner diameter larger than an outer diameter of the magnet.

The vibration generation device may further include: a power supply unit connecting the coil to an external power supply line.

The power supply unit may be a flexible printed circuit board.

The flexible printed circuit board may include a moving portion coupled to the coil, a fixed portion coupled to an outer surface of the housing, and a connecting portion connecting the moving portion and the fixed portion.

The surface of the housing in the axial direction may be provided with a protruding part protruding in the axial direction and having the magnet fitted therein.

According to another aspect of the present invention, there is provided a vibration generation device, including: a housing including an internal space; a shaft passing through the internal space in the axial direction and mounted in the housing; a bearing member vibrated in the axial direction while contacting the shaft; a yoke mounted on the bearing member; a coil mounted on an outer surface of the yoke; magnets interacting with electromagnetic force exerted on the yoke by the coil and included in the internal space; and at least one elastic member connected between an end of the yoke in the axial direction and a surface of the housing in an axial direction, wherein the magnets respectively mounted in both sides in the axial direction may be magnetized in the axial direction to be opposite to each other.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
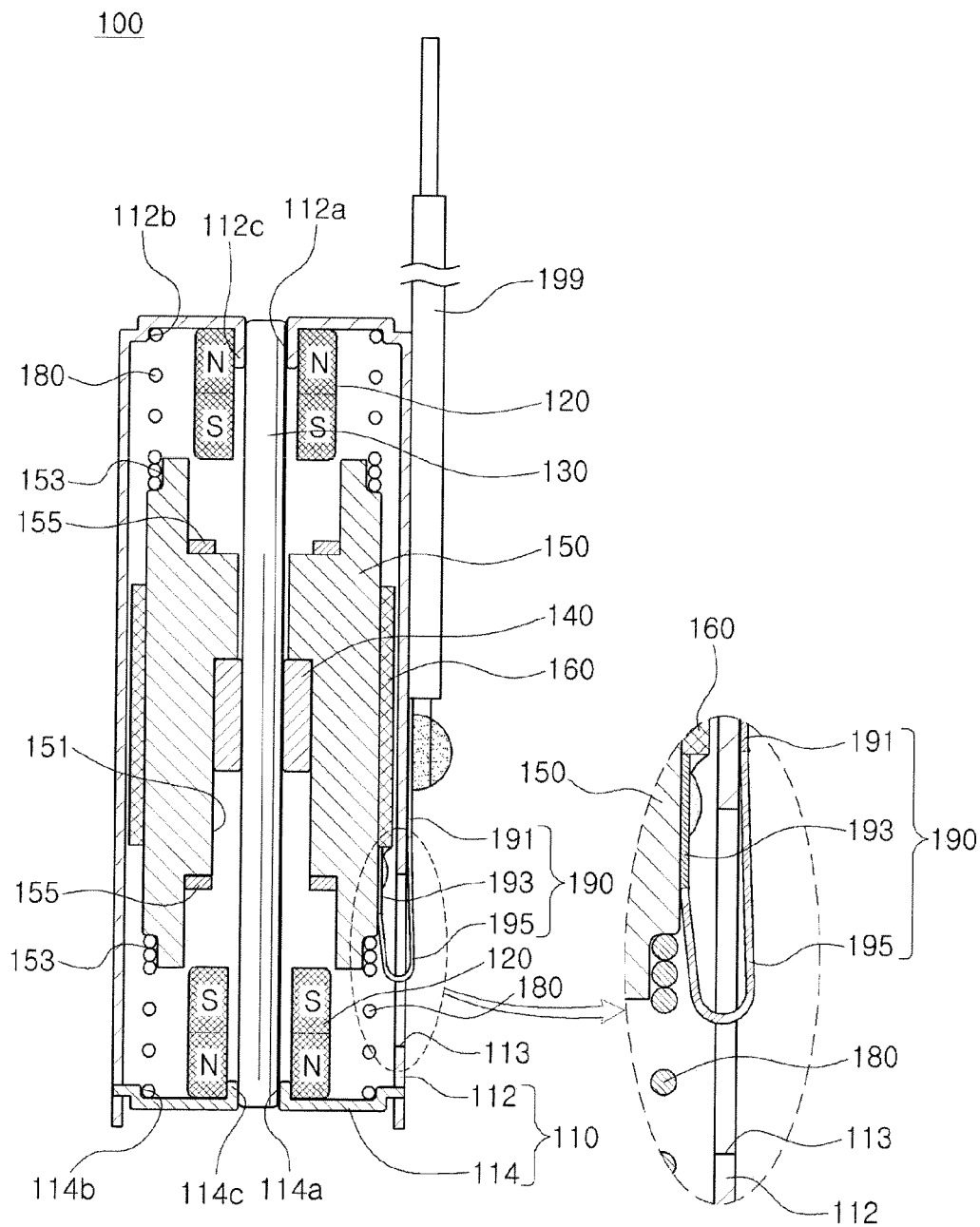
FIG. 1 is a combined cross-sectional view of a vibration generation device according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
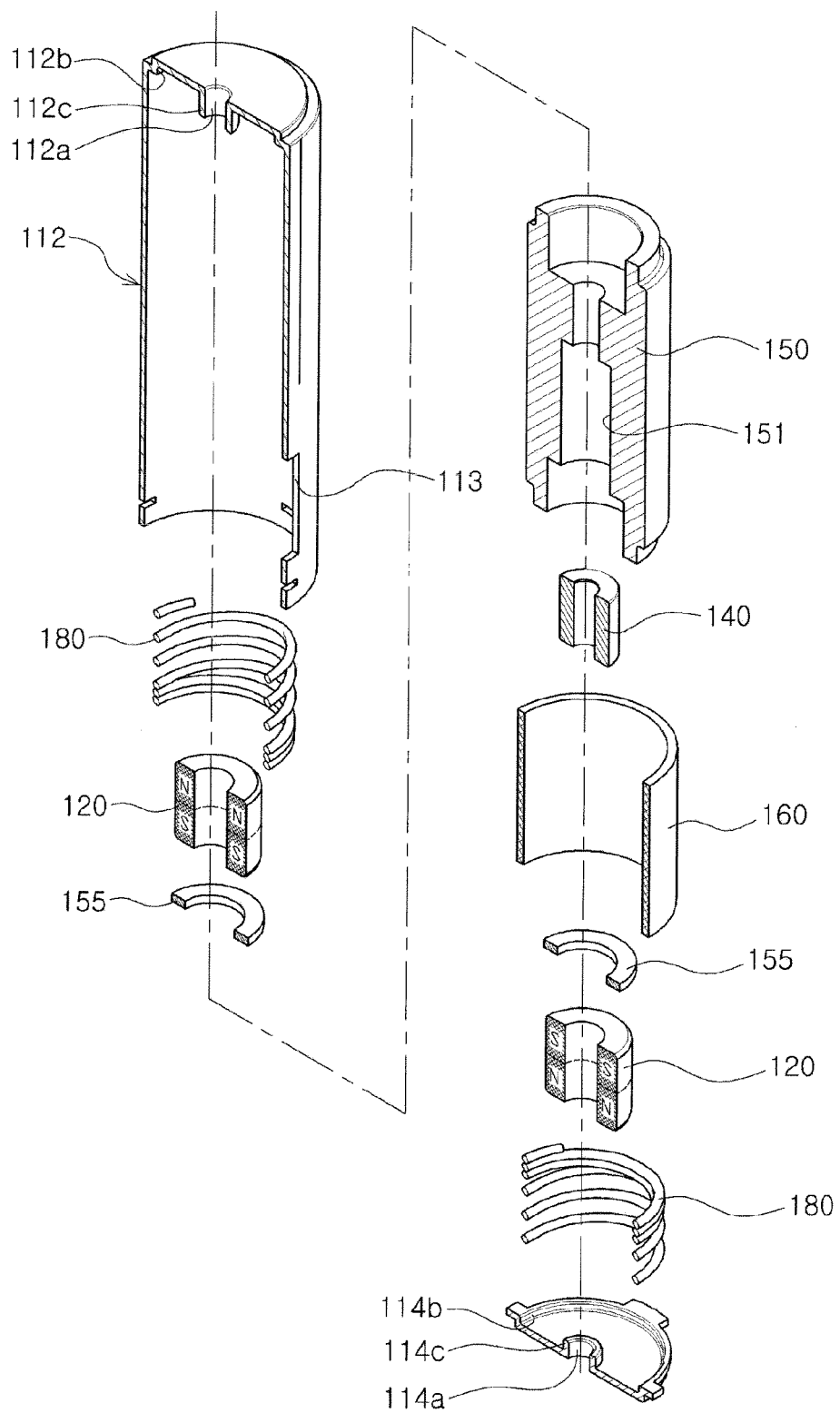
FIG. 2 is a partially cut-away exploded perspective view of the vibration generation device according to the embodiment of the present invention.
Figure 3A:
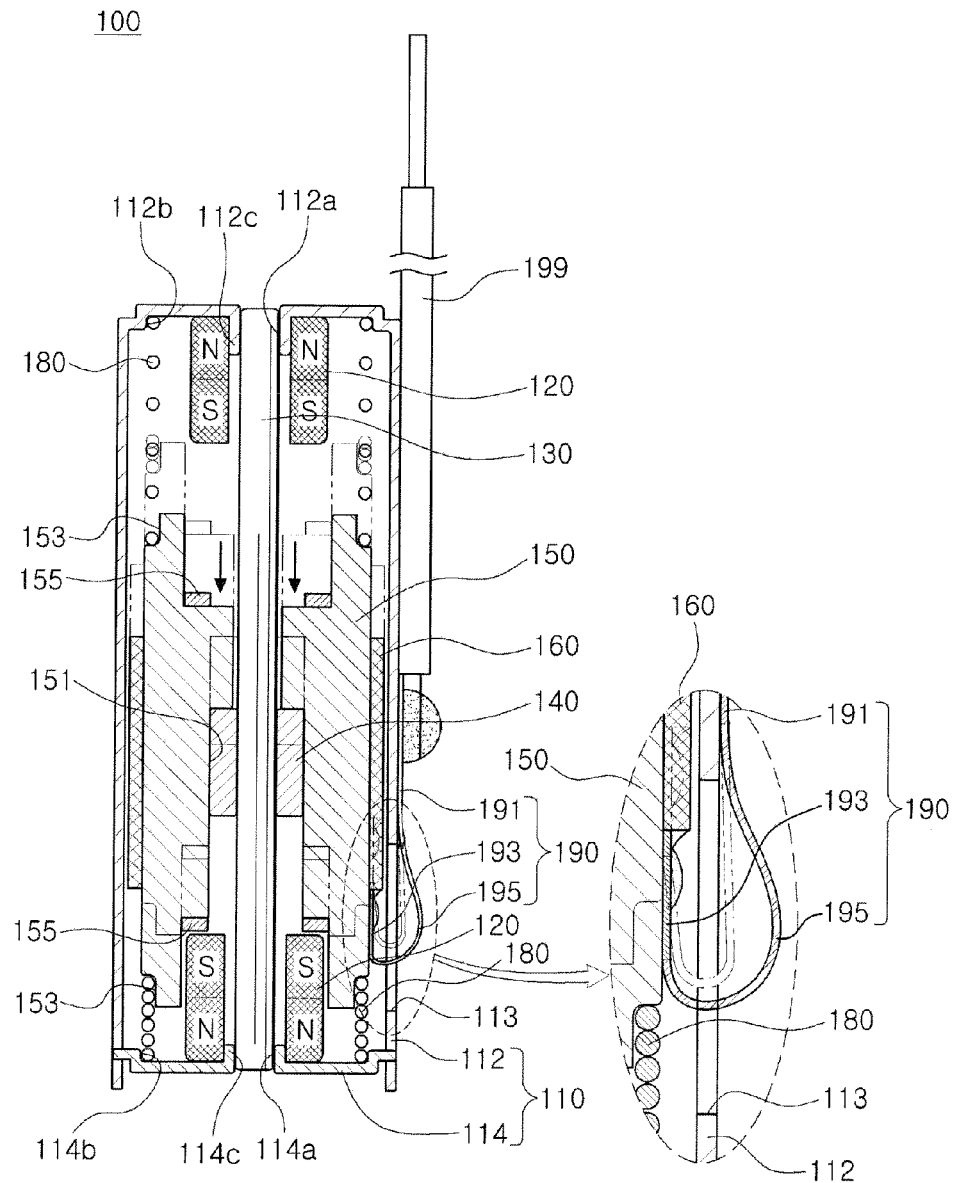
FIGS. 3A and 3B are reference diagrams illustrating a form of vibrations of the vibration generation device according to the embodiment of the present invention.
Figure 3B:
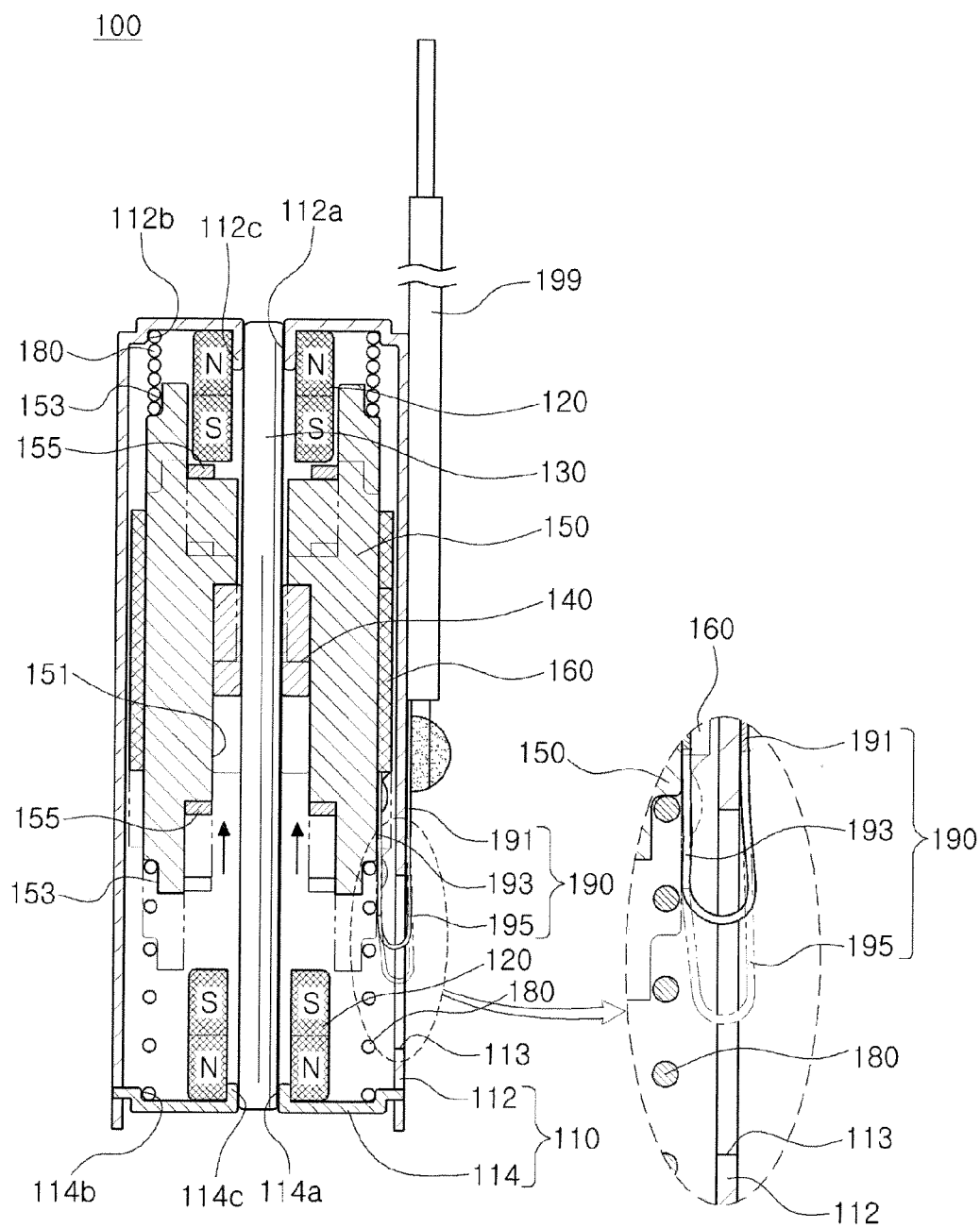

FIG. 1 is a combined cross-sectional view of a vibration generation device according to an embodiment of the present invention, FIG. 2 is a partially cut-away exploded perspective view of the vibration generation device according to the embodiment of the present invention, and FIGS. 3A and 3B are reference diagrams illustrating a form of vibrations of the vibration generation device according to the embodiment of the present invention.

Referring to FIGS. 1 through 3, a vibration generation device 100 according to an embodiment of the present invention may include, for example, a housing 110, magnets 120, a shaft 130, a bearing member 140, a yoke 150, a coil 160, elastic members 180, and a flexible printed circuit board 190 serving as a power supply unit. Further, the configuration is only an example of the present invention and therefore, some components may be excluded from the configuration or other components may be additionally disposed in the configuration.

First, when defining terms for directions, an axial direction (a longitudinal direction) refers to a vertical direction, that is, a direction from one portion of the housing 110 toward the other portion thereof or from the other portion of the housing 110 toward one portion thereof when viewing FIG. 1, and a radial direction (width direction) refers to a lateral direction when viewing FIG. 1.

Further, a circumferential direction refers to a rotational direction along an inner circumferential surface or an outer circumferential surface of a predetermined member based on a longitudinal central axis.

Meanwhile, a fixed part is a fixed member that includes the housing 110, the magnets 120, and the shaft 130, while a vibrating part, a member vibrated relatively to the fixed part, may include the bearing member 140, the yoke 150, and the coil 160. The elastic members 180 and the flexible printed circuit board 190 may connect the fixed part and the vibrating part and are members of which one ends thereof are fixed and the other ends thereof are vibrated.

The housing 110 has an internal space and forms an an exterior of the vibration generation device 100. The housing 110 may be configured to include a case 112 that includes an open portion and has an internal space and a bracket 114 that is combined with the open portion of the case 112 to shield an internal space.

The case 112 may be formed of a magnetic material in order to prevent external magnetic leakage while forming a magnetic closed circuit. However, the embodiment of the present invention is not limited thereto and therefore, the case may be formed of a non-magnetic material.

The housing 110, in particular, the case 112, may include a through hole 113 extended in the axial direction and having a width larger than that of a moving portion 193 in such a manner that the moving portion 193 of the flexible printed circuit board 190 can move freely.

The case 112 may be formed by firing working of a steel sheet (for example, press working, and the like) and may also be formed by a die casting method using other materials.

Further, both ends of an inner surface of the housing 110, forming the internal space, may be provided with fitting parts 112a and 114a. The fitting parts 112a and 114a each may be formed to have a groove shape or a hole shape. The fitting parts 112a and 114a are each fitted and fixed to both ends of a shaft 130.

Further, both ends of the inner surface of the housing 110, forming the internal space, may be provided with guide grooves 112b and 114b. The case 112 may be provided with the guide groove 112b into which an end of the elastic member 180 is inserted and the bracket 114 may also be provided with the guide groove 114b into which the end of the elastic member 180 is inserted. The guide groove 112b of the case 112 may be simply formed during a firing process for the steel sheet or a die casting process for other materials.

Further, at least one of both ends of the inner surface of the housing 110 forming the internal space may be provided with protruding parts 112c and 114c protruding toward the internal space to allow the magnets 120 to be inserted into the protruding parts 112c and 114c. The protruding parts 112c and 114c may be formed by the press working or the die casting working during the manufacturing of the case 112 or the bracket 114.

The bracket 114 may be formed of a metal so as to be firmly fixed to the case 112 and may be manufactured by firing working, die casting, and the like. However, the embodiment of the present invention is not limited thereto and therefore, the bracket 114 may be manufactured by injection molding using a synthetic resin.

In this configuration, at least one of the inner surface of the housing 110 forming the internal space and the vibrating part including the yoke 150 may include a damper 155 disposed on both ends thereof. That is, an impact absorbing member may be disposed in preparation for the case in which the vibrating part contacts the internal space of the housing 110 when the vibrating part is vibrated in the lateral direction within the internal space. However, the magnets 120 may be included on both end surfaces of the housing 110 in the axial direction and therefore, the magnets 120 may be respectively disposed on both end surfaces of the internal space of the housing 110. The magnets 120 generate a vibration driving force by electromagnetic interaction with the coil 160 included in the vibrating part.

Meanwhile, each of the magnets 120 has a cylindrical shape and includes a shaft hole so that the shaft 130 may be fitted in an inner circumferential surface of the magnet 120. The shaft 130 may or may not contact the magnet 120.

The magnet 120 may be fitted into the protruding parts 112c and 114c that protrude toward the internal space in the housing 110.

An N pole and a S pole may be magnetized in one side of each magnet 120 and the other side thereof in the axial direction. Further, the magnets 120, respectively mounted on both ends of the internal space of the housing 110 in the axial direction may be magnetized in a reversed manner. That is, the order in which an N pole and an S pole are magnetized in axial direction may be different. Therefore, even though the magnets 120 respectively mounted in both sides in a vibration direction, vibration driving force may be maximized.

The magnet 120 may include the yoke 150 disposed on an end thereof (in a direction of the yoke 150).

In this case, a mechanism for the generation of driving force by the magnet 120 will be briefly described.

First, when power is supplied to the coil 160, the yoke 150 adjacent to the coil 160 is changed to an electromagnet and the driving force is generated due to electromagnetic interaction between the yoke 150 and the magnet 120. In this case, the coil 160 is supplied with AC current and therefore, the driving force generated by the coil 160 and the magnet 120, that is, force exerted toward one portion in the axial direction and force exterted toward the other portion in the axial direction is alternately generated. Therefore, the vibrating part including the yoke 150 may be vibrated in the axial direction.

The shaft 130 may be vertically mounted in the housing 110 by passing through the internal space of the housing 110 in the axial direction (that is, a vertical direction of FIG. 1). That is, the fitting parts 112a and 114a mounted in the housing 110 may be fitted to both ends of the shaft 130.

The shaft 130 may serve to guide vibrations of the vibrating part, in the linear vibrator according to the embodiment of the present invention.

The bearing member 140 may be vibrated in a state in which the bearing member 140 contacts the outer surface of the shaft 130. That is, the bearing member 140 may be slidably mounted on the shaft 130. Here, the bearing member 140 may be moved in the axial direction (that is, the vertical direction in FIG. 1) along the shaft 130 by interaction between the magnet 120 and the coil 160.

The bearing members 140 are respectively mounted on the inner circumferential surface of an approximately central portion of the yoke 150 in the axial direction, such that a state in which the yoke 150 is spaced apart from the shaft 130 by a predetermined interval may be maintained. The bearing member 140 may have a cylindrical shape.

The inner circumferential surface of the bearing member 140 may have a circular through hole to slidably move along the outer circumferential surface of the shaft 130.

The yoke 150 may be mounted on the bearing member 140. The yoke 150 includes a through hole so that the bearing member 140 may be fitted into the through hole. That is, the yoke 150 may be mounted on the outer surface of the bearing member 140.

The yoke 150 is formed of a magnetic material and thus, may be changed to an electromagnet when power is applied to the coil 160 mounted on the outer surface thereof.

The yoke 150 may have an inner diameter larger than an outer diameter of the magnet 120 at the ends thereof in the axial direction. Therefore, even in the case that vibrations are generated in a direction in which the yoke 150 and the magnet 120 overlap with each other, the yoke 150 may not contact the magnet 120.

The yoke 150 serves as a weight body at the time of the generation of vibrations, and therefore, may be mounted as larger as possible. Therefore, the yoke 150 may be radially mounted to be thicker except for the portion thereof overlapping with the magnet 120 at the time of vibrations. In addition, a portion of the bearing member 140, other than a fitting hole 151 of the bearing member 140 mounted on the inner circumferential surface of the yoke 150 may be also thick in the radial direction, as long as the bearing member 140 may not contact the shaft 130. Therefore, the yoke 150 may have a stepped shape in the axial direction.

The coil 160 may be mounted on the outer surface of the yoke 150. The coil 160 may be fitted in the outer surface of the yoke 150 after being separately wound using a self bonding wire. Alternatively, the coil 160 may be mounted on the outer surface of the yoke 150 to be directly wound therearound. When a wire is directly wound on the outer surface of the yoke 150, a winding groove may be provided in the outer surface of the yoke 150.

Meanwhile, the coil 160 may be connected to a power supply unit that is connected to an external power supply wire, that is, the flexible printed circuit board 190. However, this is only example and therefore, other power supply units may be used.

One ends of the elastic members 180 may be respectively fixed to both ends of the vibrating part and the other ends thereof may be respectively fixed to both ends of the internal space of the housing 110 to provide additional vibratory force to the vibrating part. In more detail, the elastic members 180 may be fixed to respective ends of the yoke 150.

The elastic members 180 may form elastic force in the axial direction. Therefore, each of the elastic members 180 may be a coil spring or a leaf spring. However, the embodiment of the present invention is not limited thereto and therefore, any spring may be used if the elastic member 180 may secure an elastic force in the axial direction.

The elastic member 180 may be disposed so that the shaft 130 may penetrate the center in the axial direction. This is to prevent vibrations from being generated in the radial direction when vibrations are generated in the axial direction at the time of the vibrations of the vibrating part.

The elastic members 180 may be disposed so that one ends thereof are fitted into the guide grooves 112b and 114b of the housing 110. In addition, the other ends of the elastic members 180 may be fitted in step fixing parts 153 that are mounted at both ends of the yoke 150.

The power supply unit may allow for the appliance of power by connecting a lead wire of the coil 160 to the external power supply. The power supply unit may be the flexible printed circuit board 190.

The flexible printed circuit board 190 may include the moving portion 193 connected to the lead wire of the coil 160 and fixed to the outer surface of the vibrating part (in detail, the yoke 150), a external power supplying lead wire, a fixed portion 191 fixed to the outer surface of the housing 110 (in detail, the case 112), and a connecting portion 195 that connects the fixed portion 191 and the moving portion 193. The moving portion 193 and the lead wire of the coil 160, and the fixing portion 191 and the lead wire may be connected by various connection methods such as soldering, welding, bonding, and the like.

Here, a diameter of the through hole 113 mounted in the housing 110 (in detail, the case 112) is larger than that of the connecting portion 195 such that the case 112 may not contact the connecting portion 195.

In addition, the through hole 113 is provided in the axial direction and the connecting portion 195 may also be provided in the axial direction. The through hole 113 and the connecting portion 195 are mounted in parallel, such that the connecting portion 195 may not contact the through hole 113 even in the case of the vibrations of the vibrating part.

Meanwhile, the moving portion 193 needs not to contact the inner circumferential surface of the case 112.

The form of vibrations of the vibration generation device 100 according to the embodiment of the present invention will be described with reference to FIGS. 3A and 3B.

Referring to FIG. 3A, the vibrating part of the vibration generation device 100 may be moved downwardly in the axial direction. That is, the vibrating part moving relatively with regard to the fixing part may move downwardly in the axial direction.

When the vibrating part moves downwardly in the axial direction, the remaining members other than the flexible printed circuit board 190 in the vibration generation device 100, do not move in the radial direction, but only move in the axial direction or maintain the fixed state thereof.

However, the connecting portion 195 of the flexible printed circuit board 190 moves outwardly in the radial direction (rightwardly in drawings). However, the movement of the connecting portion 195 outwardly in the radial direction may be located inwardly rather than the outermost portion of a lead wire 199 directed outwardly in the radial direction, whereby the connecting portion 195 does not contact another member.

Next, referring to FIG. 3B, the vibrating part of the vibration generation device 100 may be moved upwardly in the axial direction. That is, the vibrating part moving relatively with regard to the fixing part may move upwardly in the axial direction.

When the vibrating part moves upwardly in the axial direction, the remaining members other than the flexible printed circuit board 190 in the vibration generation device 100 do not move in the radial direction but moves only in the axial direction or maintains the fixed state thereof.

However, the connecting portion 195 of the flexible printed circuit board 190 may move inwardly in the radial direction (leftwardly in drawings). However, the movement of the connecting portion 195 inwardly in the radial direction may be located outwardly rather than the outermost portion of the elastic members 180, whereby the connecting portion 195 does not contact the elastic members 180. However, even though the connecting portion 195 contacts the elastic member 180, the contact may correspond to a surface contact.

Figure 4:
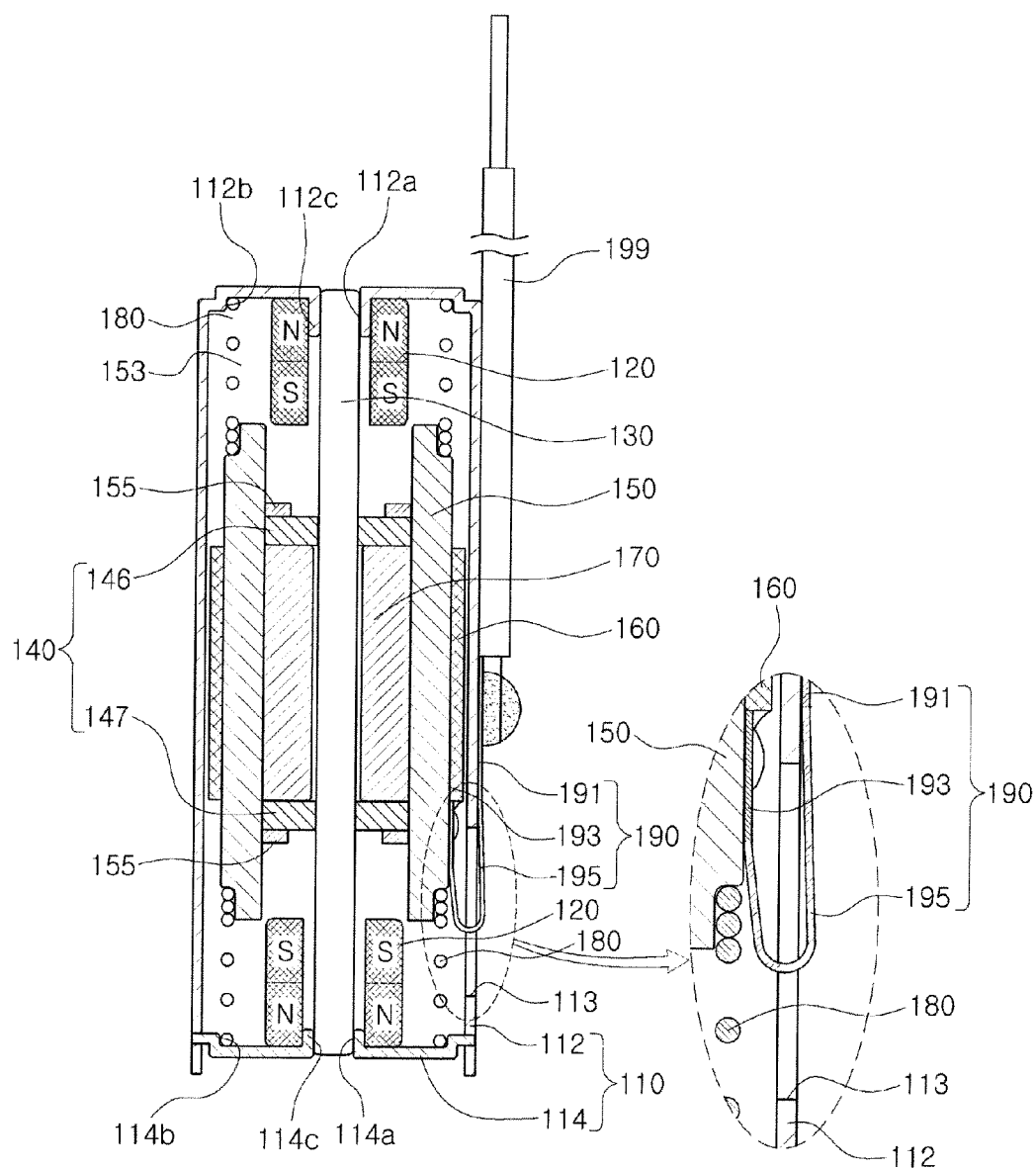
FIG. 4 is a combined cross-sectional view of a vibration generation device according to another embodiment of the present invention.
Figure 5:
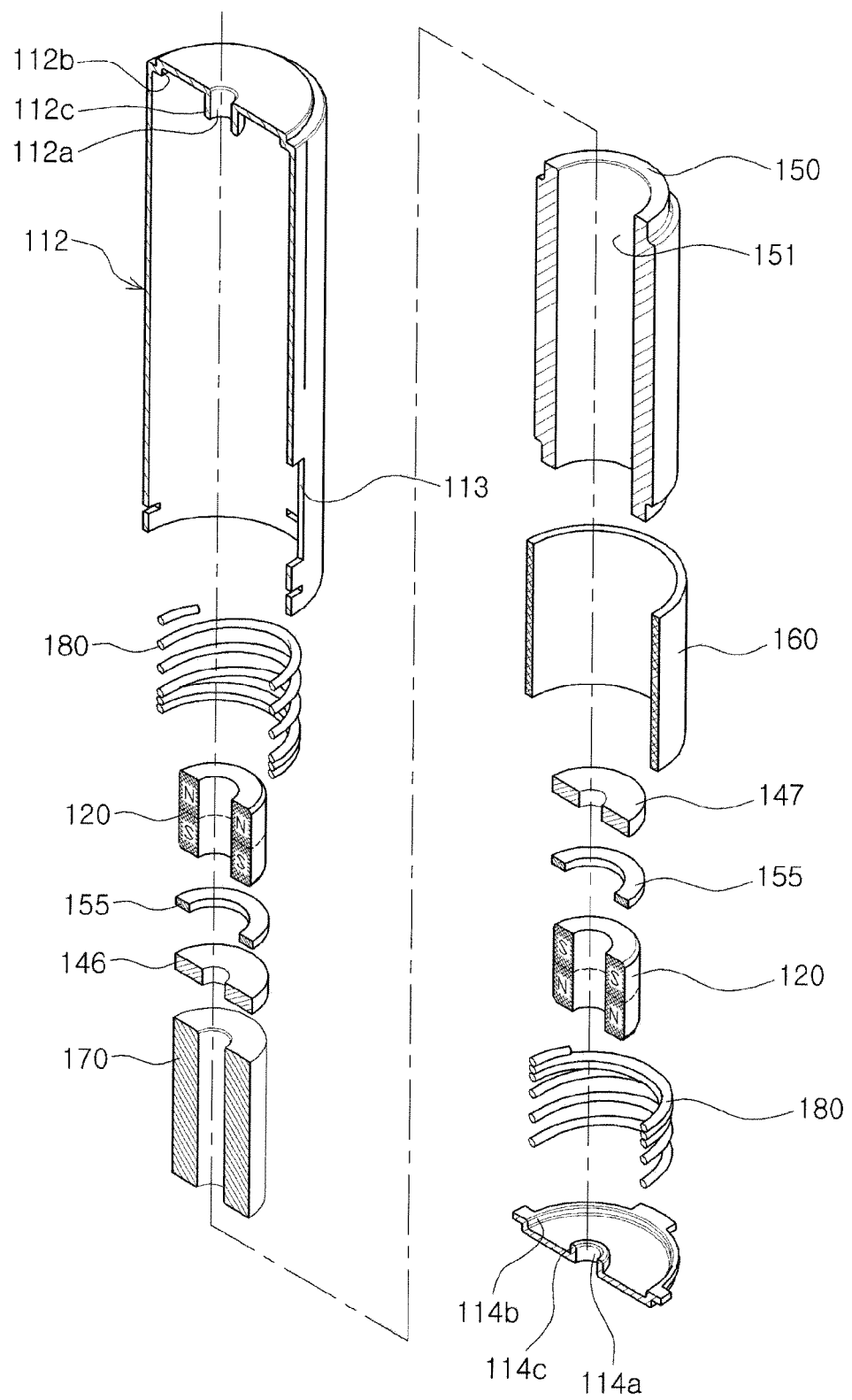
FIG. 5 is a partially cut-away exploded perspective view of a vibration generation device according to another embodiment of the present invention.

FIG. 4 is a combined cross-sectional view of a vibration generation device according to another embodiment of the present invention and FIG. 5 is a partially cut-away exploded perspective view of a vibration generation device according to another embodiment of the present invention.

Referring to FIGS. 4 and 5, a vibration generation device 200 according to another embodiment of the present invention may be configured to include, for example, the housing 110, the magnets 120, the shaft 130, the bearing member 140, the yoke 150, the coil 160, a weight body 170, the elastic members 180, and the flexible printed circuit board 190 as a power supply unit. Further, the configuration is only an example of the present invention and therefore, some components may be excluded from the configuration or other components may be additionally disposed in the configuration.

In this configuration, the vibration generation device 200 according to another embodiment of the present invention is different from the vibration generation device 100 described with reference to FIGS. 1 to 3B in that the weight body 170 is further included and the bearing member 140 is provided as a pair of bearing members, wherein the pair of bearing member are separated from each other. Therefore, different components will mainly be described and the remaining components may be replaced with those described with reference to FIGS. 1 and 3B.

In the vibration generation device 200 according to another embodiment of the present invention, the bearing member 140 includes first and second bearing members 146 and 147 that are disposed to be spaced from each other in the axial direction and the weight body 170 may be mounted between the first and second bearing members 146 and 147.

The bearing member 140 is divided into the first and second bearing members 146 and 147 in the axial direction, thereby more accurately maintaining the degree of axial parallelization of the vibrating part.

Further, the weight body 170 may be mounted between the first and second bearing members 146 and 147. Further, the outer surfaces of the first and second bearing members 146 and 147 and the weight body 170 may be disposed in parallel in the axial direction.

Further, the yokes 150 that are mounted on the outer surfaces of the bearing member 140 and the weight body 170 may be mounted on the outer surfaces of the bearing member and the weight body so as to protrude to the both ends of the first and second bearing members in the axial direction 146 and 147.

Further, both ends of the yoke 150 in the axial direction may have an inner diameter larger than an outer diameter of the magnet 120. In this case, the yoke 150 has a cylindrical shape and the fitting hole 151 provided in the axial direction may have the bearing member 140 and the weight body 170 fitted therein.

The weight body 170 may allow for continuos vibrations when driving force is generated by electromagnetic interaction between the coil 160 and the magnet 120. To this end, the weight body 170 may be formed of a material having a high specific gravity. For example, the weight body 170 may be formed of a non-magnetic material, for example, a copper-based material such as brass, or a tungsten material.

Meanwhile, in the vibration generation device 200 according to another embodiment of the present invention, the damper 155 may be mounted at the outside of the first and second bearing members 146 and 147.

Figure 6:
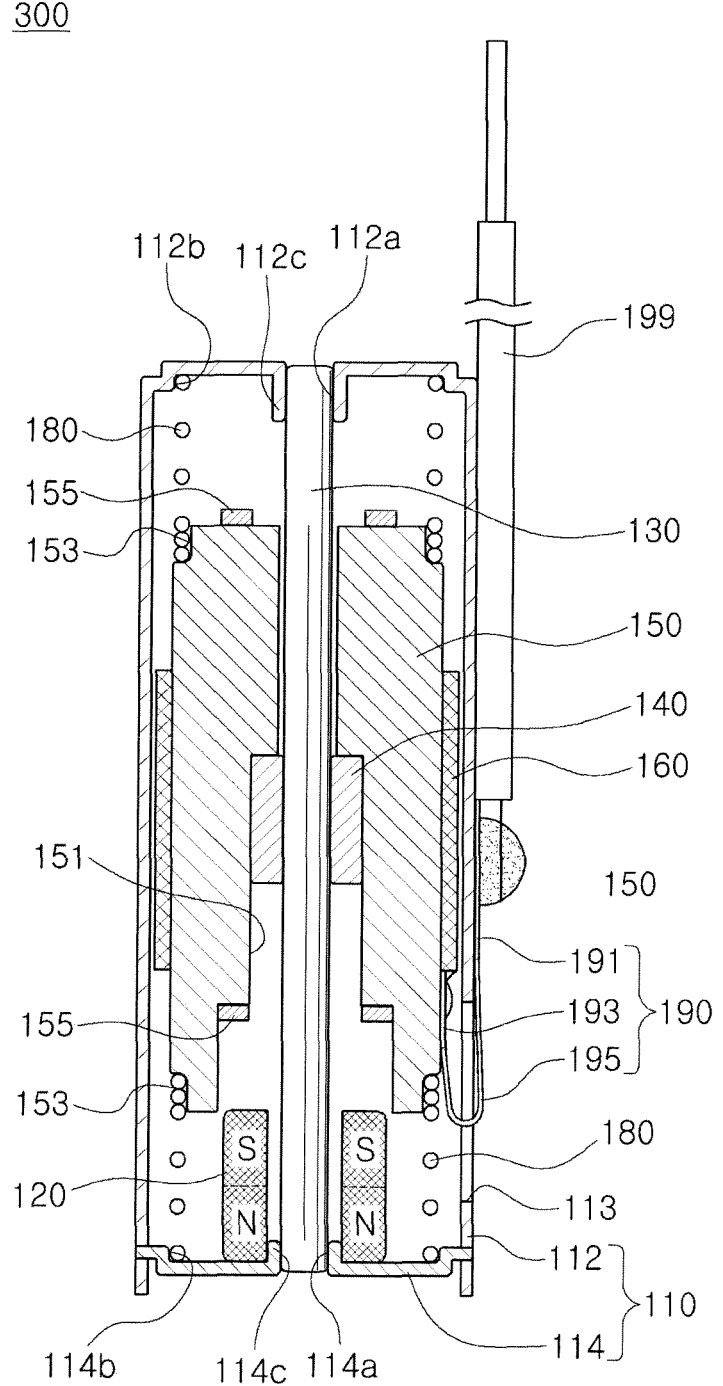
FIGS. 6 and 7 are combined cross-sectional views of a vibration generation device according to another embodiment of the present invention.
Figure 7:
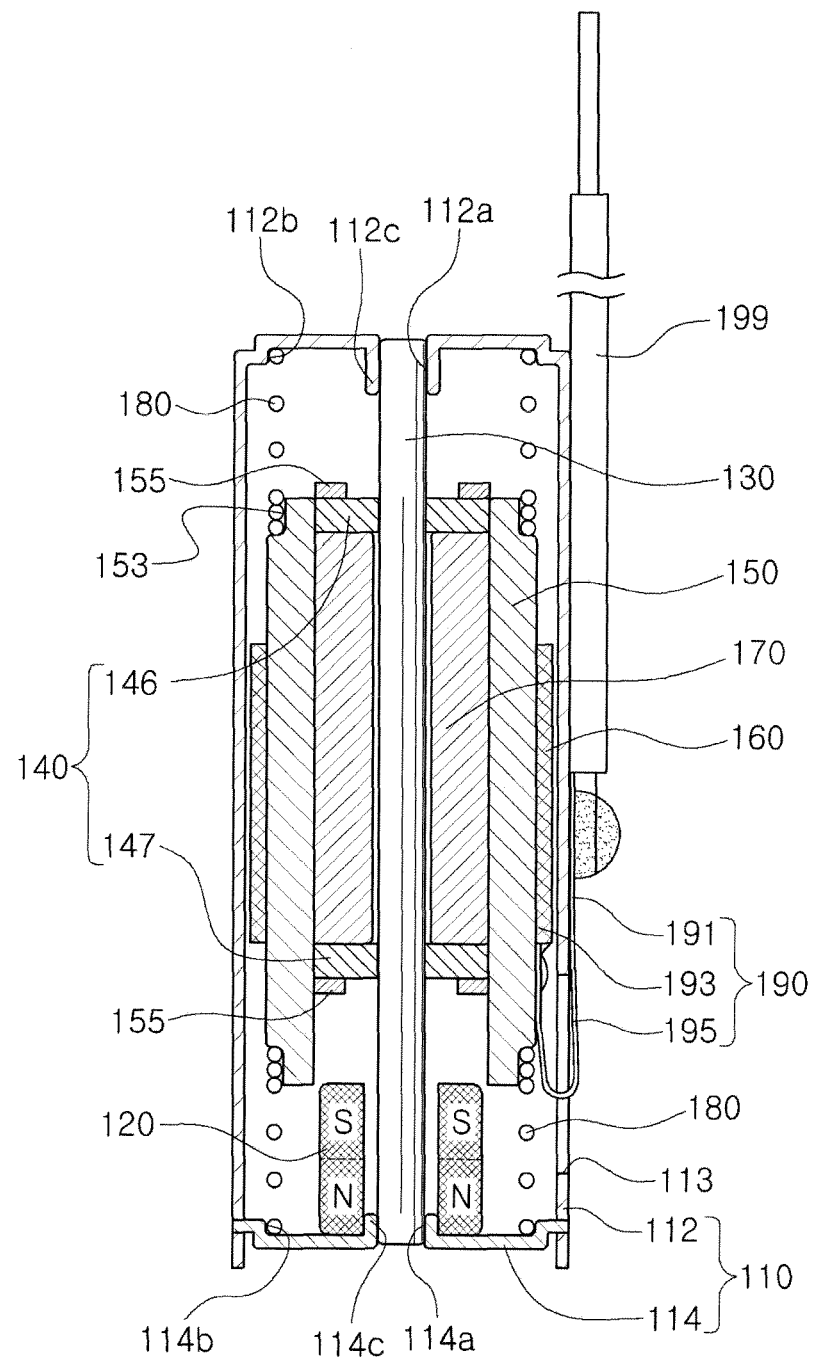

FIGS. 6 and 7 are combined cross-sectional views of a vibration generation device according to another embodiment of the present invention.

Referring to FIG. 6, a vibration generation device 300 according to another embodiment of the present invention may include, for example, the housing 110, a single magnet 120, the shaft 130, the bearing member 140, the yoke 150, the coil 160, the elastic members 180, and the flexible printed circuit board 190 as a power supply unit. Further, the configuration is only an example of the present invention and therefore, some components may be excluded from the configuration or other components may be additionally disposed in the configuration.

In this case, the vibration generation device 300 according to another embodiment of the present invention is different from the vibration generation device 100 described with reference to FIGS. 1 to 3B in that the magnet 120 is mounted only in one side in the axial direction. Therefore, different components will mainly be described and the remaining components may be replaced with those described with reference to FIGS. 1 and 3B.

In the vibration generation device 300 according to another embodiment of the present invention, the magnet 120 may only be mounted in one side in the axial direction.

Therefore, the other side in the axial direction, in which the magnet 120 is not mounted, may be filled with the yoke 150 having volume as great as possible without an empty space. This is to improve vibration performance.

The vibration generation device 100 according to the embodiment of FIGS. 1 to 3B has a vertically symmetrical shape based on the approximately center in the axial direction except for the power supply unit. However, the vibration generation device 300 according to another embodiment of the present invention includes the magnet 120 only in one side in the axial direction and therefore, has a vertically asymmetrical shape based on the approximately center in the axial direction.

Such a shape may facilitate the manufacturing of the vibration generation device having a reduced size.

Referring to FIG. 7, a vibration generation device 400 according to another embodiment of the present invention may include, for example, the housing 110, the magnet 120, the shaft 130, the bearing member 140, the yoke 150, the coil 160, the weight body 170, the elastic member 180, and the flexible printed circuit board 190 as a power supply unit. Further, the configuration is only an example of the present invention and therefore, some components may be excluded from the configuration or other components may be additionally disposed in the configuration.

In this case, the vibration generation device 400 according to another embodiment of the present invention is different from the vibration generation device 200 described with reference to FIGS. 4 and 5 in that the magnet 120 is mounted only in one side in the axial direction. Therefore, different components will mainly be described and the remaining components may be replaced with those described with reference to FIGS. 4 and 5.

In the vibration generation device 400 according to another embodiment of the present invention, the magnet 120 may be mounted only in one side in the axial direction.

Therefore, the other side in the axial direction, in which the magnet 120 is not mounted, may be filled with the yoke 150 having volume as great as possible without an empty space. This is to improve vibration performance.

That is, the vibration generation device 200 according to the embodiment of FIGS. 4 and 5 has a vertically symmetrical shape based on the approximately center in the axial direction except for the power supply unit. However, the vibration generation device 400 according to another embodiment of the present invention includes the magnet 120 only in one side in the axial direction and therefore, has a vertically asymmetrical shape based on the approximately center in the axial direction.

Such a shape may facilitate the manufacturing of the vibration generation device having a reduced size.

As set forth above, according to the embodiments of the present inveniton, a smaller linear vibrator by efficiently improving a disposition of components in the linear vibrator can be provided.

Further, a linear vibrator capable of preventing a magnet from interacting with a magnetic material therearound during vibrations by configuring the magnet as a stator, can be provided.

While the present invention has been shown and described in connection with the embodiments, it will be apparent to those skilled in the art that modifications and variations can be made without departing from the spirit and scope of the invention as defined by the appended claims.

What is claimed is:

1. A vibration generation device, comprising:
a housing including an internal space;
a shaft passing through the internal space in an axial direction and mounted in the housing;
a bearing member vibrated in the axial direction while contacting the shaft;
a yoke mounted on the bearing member;
a coil mounted on an outer surface of the yoke;
a magnet interacting with electromagnetic force exerted on the yoke by the coil and included in the internal space; and
at least one elastic member connected between an end of the yoke in the axial direction and a surface of the housing in the axial direction.

2. The vibration generation device of claim 1, wherein the coil is wound around the outer surface of the yoke.

3. The vibration generation device of claim 1, wherein the magnet is mounted on the surface of the housing in the axial direction.

4. The vibration generation device of claim 3, wherein the end of the yoke in the axial direction has an inner diameter larger than an outer diameter of the magnet.

5. The vibration generation device of claim 1, wherein the bearing member includes first and second bearing members spaced apart from each other in the axial direction, and
the first and second bearing members include a weight body therebetween.

6. The vibration generation device of claim 5, wherein outer surfaces of the bearing member and the weight body are disposed in parallel in the axial direction, and
the yoke is mounted on the outer surfaces of the bearing member and the weight body so as to protrude to both ends of the first and second bearing members in the axial direction.

7. The vibration generation device of claim 6, wherein both ends of the yoke in the axial direction have an inner diameter larger than an outer diameter of the magnet.

8. The vibration generation device of claim 1, further comprising a power supply unit connecting the coil to an external power supply line.

9. The vibration generation device of claim 8, wherein the power supply unit is a flexible printed circuit board.

10. The vibration generation device of claim 9, wherein the flexible printed circuit board includes a moving portion coupled to the coil, a fixed portion coupled to an outer surface of the housing, and a connecting portion connecting the moving portion and the fixed portion.

11. The vibration generation device of claim 3, wherein the surface of the housing in the axial direction is provided with a protruding part protruding in the axial direction and having the magnet fitted therein.

12. A vibration generation device, comprising:
a housing including an internal space;
a shaft passing through the internal space in an axial direction and mounted in the housing;
a bearing member vibrated in the axial direction while contacting the shaft;
a yoke mounted on the bearing member;
a coil mounted on an outer surface of the yoke;
magnets interacting with electromagnetic force exerted on the yoke by the coil and included in the internal space; and
at least one elastic member connected between an end of the yoke in the axial direction and a surface of the housing in the axial direction,
wherein the magnets respectively mounted on both sides of the internal space of the housing in the axial direction are magnetized in a reversed manner in the axial direction.

* * * * *